United States Patent
Bauchot

(10) Patent No.: US 6,931,356 B2
(45) Date of Patent: *Aug. 16, 2005

(54) SYSTEM FOR DYNAMICALLY ADJUSTING PERFORMANCE MEASUREMENTS ACCORDING TO PROVIDED SERVICE LEVEL

(75) Inventor: Frederic Bauchot, St. Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 10/391,098

(22) Filed: Mar. 18, 2003

(65) Prior Publication Data

US 2003/0187972 A1 Oct. 2, 2003

(30) Foreign Application Priority Data

Mar. 21, 2002 (EP) .............................................. 02368028

(51) Int. Cl.[7] .......................................... G06F 15/173
(52) U.S. Cl. ...................... 702/188; 702/81; 702/176; 702/177; 702/182; 370/395.21; 709/224
(58) Field of Search ............................ 702/81, 82, 84, 702/176–178, 182, 186, 188; 370/395.21, 395.41–395.43, 230; 709/223–226

(56) References Cited

U.S. PATENT DOCUMENTS

| | | | | |
|---|---|---|---|---|
| 6,028,842 A | * | 2/2000 | Chapman et al. ........... | 370/235 |
| 6,345,185 B1 | * | 2/2002 | Yoon et al. .................. | 455/436 |
| 6,459,682 B1 | * | 10/2002 | Ellesson et al. ............. | 370/235 |
| H2051 H | * | 11/2002 | Zhu et al. ............... | 370/395.21 |
| 6,571,290 B2 | * | 5/2003 | Selgas et al. ................ | 709/228 |
| 6,745,242 B1 | * | 6/2004 | Schick et al. ................ | 709/224 |
| 6,798,742 B1 | * | 9/2004 | Mawhinney et al. ........ | 370/230 |
| 2002/0083169 A1 | * | 6/2002 | Aki et al. .................... | 709/224 |
| 2002/0194319 A1 | * | 12/2002 | Ritche ......................... | 709/223 |
| 2003/0145080 A1 | * | 7/2003 | Breese et al. ................ | 709/224 |
| 2003/0198235 A1 | * | 10/2003 | Weldon et al. .............. | 370/401 |

OTHER PUBLICATIONS

Bauchot, F. et al. "Method and System for Dynamically Adjusting Performance Measurements According to Provided Service Level", IBM Patent Application, filed concurrently with this application. Serial number not available.

* cited by examiner

Primary Examiner—Marc S. Hoff
Assistant Examiner—Jeffrey R. West
(74) Attorney, Agent, or Firm—John R. Pivnichny; Greenblum & Bernstein PLC

(57) ABSTRACT

Methods, systems and programs in an information processing system comprising one or a plurality of devices managed by a manager device, for decreasing the cost of monitoring measurements, while using conventional techniques for managing problems. The cost saving is achieved when the managed devices conform to the expected quality of service. This saving does not negatively affect the response time required to detect either solid failures or performance problems.

12 Claims, 3 Drawing Sheets

SYSTEM FOR DYNAMICALLY ADJUSTING PERFORMANCE MEASUREMENTS ACCORDING TO PROVIDED SERVICE LEVEL

CROSS-REFERENCE TO RELATED APPLICATIONS

Reference is made to application Ser. No. 10/391,097 entitled "METHOD FOR DYNAMICALLY ADJUSTING PERFORMANCE MEASUREMENTS ACCORDING TO PROVIDED SERVICE LEVEL", filed Mar. 18, 2003, assigned to the Assignee of the current application, and herein incorporated by reference.

TECHNICAL FIELD OF THE INVENTION

The present invention relates to a measurement system in the field of information processing or communication systems, and more particularly to a method, system and program in an information processing system comprising devices managed by a manager device, for dynamically adjusting according to the level of service provided by each managed device, the frequency and amount of information to report to the manager device.

BACKGROUND

Most conventional strategies developed to handle situations where the performance of a system degrades need in-depth investigation procedures for retrieving information from the devices experiencing problems. This information, which will be referred to as Service Level information (or SL information for short), is collected, recorded, and updated by the various devices constituting the system and is used to quantitatively and collectively measure the performance of the system. Such strategies are, for instance, based on polling or tracing mechanisms. Their purpose is:

first, to collect the relevant of SL information within the devices having recording capabilities and potentially experiencing problems, second, to share this SL information with a device, which will be referred to as Service Level manager device or SL manager device, and third, to perform in the SL manager device an analysis of the problem, in order to detect the cause of the observed degradation so that the appropriate bypass means and/or repair actions may be initiated.

The bypass means or repair actions are commonly launched or executed when indicators (part of the SL information) reflecting a failure or a severe degradation of performance reach a predefined status or value. When such an event occurs, the system deliberately allocates as many resources as possible to handle the problem, even to the detriment of the service. This strategy is efficient when high priority is put on the resolution of the problem rather than on the performance of the system or on the service provided to the users.

These strategies may consume costly resources. For instance, the exchange of SL information requires communication bandwidth between the SL manager device and the monitored devices, and processing resources in both the SL manager device and the monitored devices for carrying out the protocols supporting these strategies.

As the reliability of hardware devices and the quality of communication media continue to improve, the cost of the aforementioned SL strategies is increasingly perceived as being excessive.

SUMMARY

The present invention includes methods, systems and programs in an information processing system comprising devices managed by a manager device, for decreasing the cost of monitoring measurements, while using conventional techniques for managing problems. The cost saving is achieved when the managed devices behave correctly, i.e., when the managed devices fully conform to the expected quality of service. This saving does not negatively affect the response time required to detect either solid failures or performance problems.

The present invention is directed to a method, system and program in an information processing system comprising devices managed by a manager device, for dynamically adjusting, according to the level of service provided by each managed device, the frequency and amount of information reported to the manager device.

More particularly, the present invention is directed to a management method for use in a manager device, to a manager device, and to a computer program for dynamically adjusting the amount of information retrieved from managed devices in an information processing system, according to a provided level of service. The method comprises for each managed device, the steps of:

each time an event generated by an alive timer is detected:
    sending an alive request to the managed device for determining whether the managed device is alive or not;

each time an event generated by a monitoring timer is detected:
    if, based on service level information previously stored, the service level provided by the managed device is considered by the manager device as outstanding:
    sending a monitoring request to the managed device for requesting a small amount of monitoring information;
    if, based on service level information previously stored, the service level provided by the managed device is considered by the manager device as not outstanding:
    sending a monitoring request to the managed device for requesting a large amount of monitoring information;

if a monitoring reply is received from the managed device in response to a monitoring request or to an alive request:
    determining, based on service level information comprised in the monitoring reply, whether the level of service provided by the managed device should be considered by the manager device as outstanding or not;
    storing the service level information;

if no alive reply to an alive request or no monitoring reply to a monitoring request is received from the managed device, and if, based on the service level information previously stored, the level of service provided by the managed device is considered by the manager device as outstanding:
    sending a monitoring request to the managed device for requesting a large amount of monitoring information; and
    updating the service level information previously stored by indicating that the service level provided by the managed device is considered by the manager device as not outstanding.

The present invention is also directed to a management method for use in a device managed by a manager device, in an information processing system comprising one or a plurality of managed devices, for dynamically adjusting, according to a provided level of service, the amount of information to send to the manager device. The method comprises the steps of:

if an alive request is received from the manager device:

if, based on service level information previously stored, the managed device considers that the level of service is not degrading:

sending to the manager device an alive reply to the received alive request;

if, based on service level information previously stored, the managed device considers that the provided level of service is degrading:

updating the service level information previously stored by indicating that the service level provided by the managed device is not outstanding;

sending to the manager device a monitoring reply comprising a large amount of monitoring information comprising the service level information;

if a monitoring request for requesting a large amount of monitoring information is received from the manager device:

updating the service level information previously stored by indicating that the service level provided by the managed device is not outstanding;

sending to the manager device a monitoring reply comprising the requested large amount of monitoring information comprising the service level information;

if a monitoring request for requesting a small amount of monitoring information is received from the manager device:

if, based on service level information previously stored, the managed device considers that the level of service is not degrading:

updating the service level information previously stored by indicating that the service level provided by the managed device is outstanding;

sending to the manager device a monitoring reply comprising the requested small amount of monitoring information comprising the service level information;

if, based on a service level information previously stored, the managed device considers that the provided level of service is degrading:

updating the service level information previously stored by indicating that the service level provided by the managed device is not outstanding;

sending to the manager device a monitoring reply comprising a large amount of monitoring information, said monitoring information comprising the service level information;

if an event indicating that the level of service provided by the managed device is degrading is received:

if, based on the service level information previously stored, the managed device considers that the provided level of service is outstanding:

updating the service level information previously stored by indicating that the service level provided by the managed device is degrading.

The foregoing, together with other objects, features, and advantages of this invention will be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION

Figure 1:
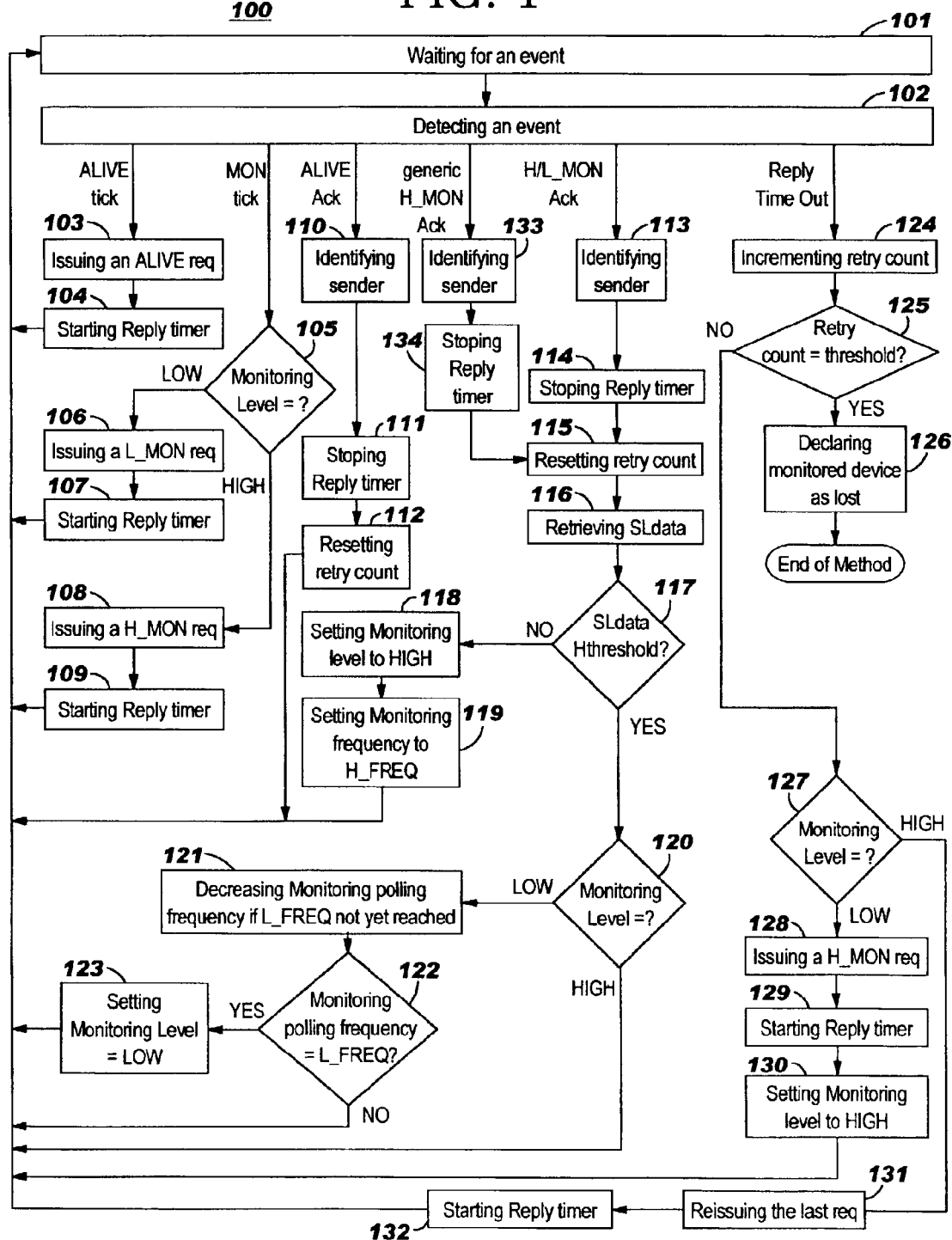
FIG. 1 shows a method for executing an "SL_Manager" command according to a preferred embodiment of the present invention.

The present invention relates to a management method and system, within a system, for dynamically adjusting SL information measurements according to the observed performance of this system. In the following, the illustrated managed system includes a communication network. However any other technical or organizational managed system may take advantage of the present invention.

A. Vocabulary

The following vocabulary is related to conventional concepts in the field of communication networks.

Timer: this term refers to a time measuring device which, once started, issues a time-out event after a predefined time duration. If the timer is first started and then stopped before the predefined time duration has elapsed, then no time-out event is issued.

Free-running timer: this term refers to a timer which automatically restarts each time a time-out event is issued. Therefore a free-running timer issues successive time-out events on a periodic basis. The period associated with the timer corresponds to a predefined time duration.

Tick: a tick refers to a time-out event, when the timer is a free-running timer.

Reply timer: when the monitoring device sends a request to a monitored device, a timer known as a "reply timer" is started in order to detect whether an acknowledgement is returned or not within a predefined time delay. If no acknowledgement is returned within the predefined delay, a reply time-out event is detected. If multiple successive reply time-out events are detected (number of retries reaching a predefined threshold), then the monitored device is considered as lost.

Alive: this term refers to a "heart beat" protocol used by the monitoring device to regularly check that a monitored device is running. This protocol relies on an ALIVE free-running timer. The monitoring device sends an ALIVE request to the monitored device which in turn must reply with an ALIVE acknowledgement. A reply timer is started when the ALIVE request is sent to detect whether an ALIVE acknowledgement (Reply Time-out event) has been received or not. The ALIVE protocol is based on short messages (request and acknowledgement), and for this reason, is cheap to implement and easy to use. A well known example of ALIVE protocol is the Internet Control Message Protocol (ICMP) for exchanging PING messages within IP (Internet Protocol) communication networks.

Monitoring: this term refers to a "measurement" protocol used by the monitoring device to regularly retrieve SL information from the monitored device. This protocol relies on a MON free-running timer. The monitoring device sends a MON request to the monitored device, which in turn replies with a MON acknowledgement. A reply timer is started when the MON request is sent in order to detect whether the MON acknowledgement (Reply Time-out event) has been received or not. The MON protocol is based on large messages (request and acknowledgement), and for this reason is relatively expensive to implement and use. A well known example of a MON protocol is the Simple Network Management Protocol (SNNP) for exchanging GET messages in IP (Internet Protocol) communication networks.

SL Degrade: within the monitored device, SL information is continuously collected using conventional means. According to the present invention, when the monitored device detects a degradation of the service level, which means that the performance can no longer be considered as meeting a predetermined level of service, an "SL Degrade" event is issued.

B. Communication Network Management System

Today there are multiple conventional ways of managing a communication network system. Different network management standards have been approved by normalization organizations, and different networking technologies and protocols are currently deployed all over the world. Each of these management systems comprises means for managing sudden severe problems (such as failure of the power supply of a communication device), and managing a slow degradation of the performances in a communication network (such as an increase of the packet or cell discard rate under traffic congestion conditions).

When a communication network system encounters either a sudden severe problem or a degradation of its performance, these events affect the level of service that the communication network system provides to its users (the various workstations, servers, printers, etc. interconnected through the communication network system). Measurement of the communication network behavior (its health) is commonly tied to parameters which form the service level objectives (SLO), or the service level agreements (SLA). In the following, the service level acronym SL encompasses both SLO and SLA.

The means for managing a communication network are generally arranged according to a hierarchical order where a so-called "SL Manager" entity plays a central role to collect, manage and handle SL information retrieved from one or a plurality of so-called "SL Managed" entities. Although conventional means can distribute the role of SL Manager among multiple devices, it will be assumed here for more clarity, that this role is played by a single "SL Manager" device.

Figure 3:
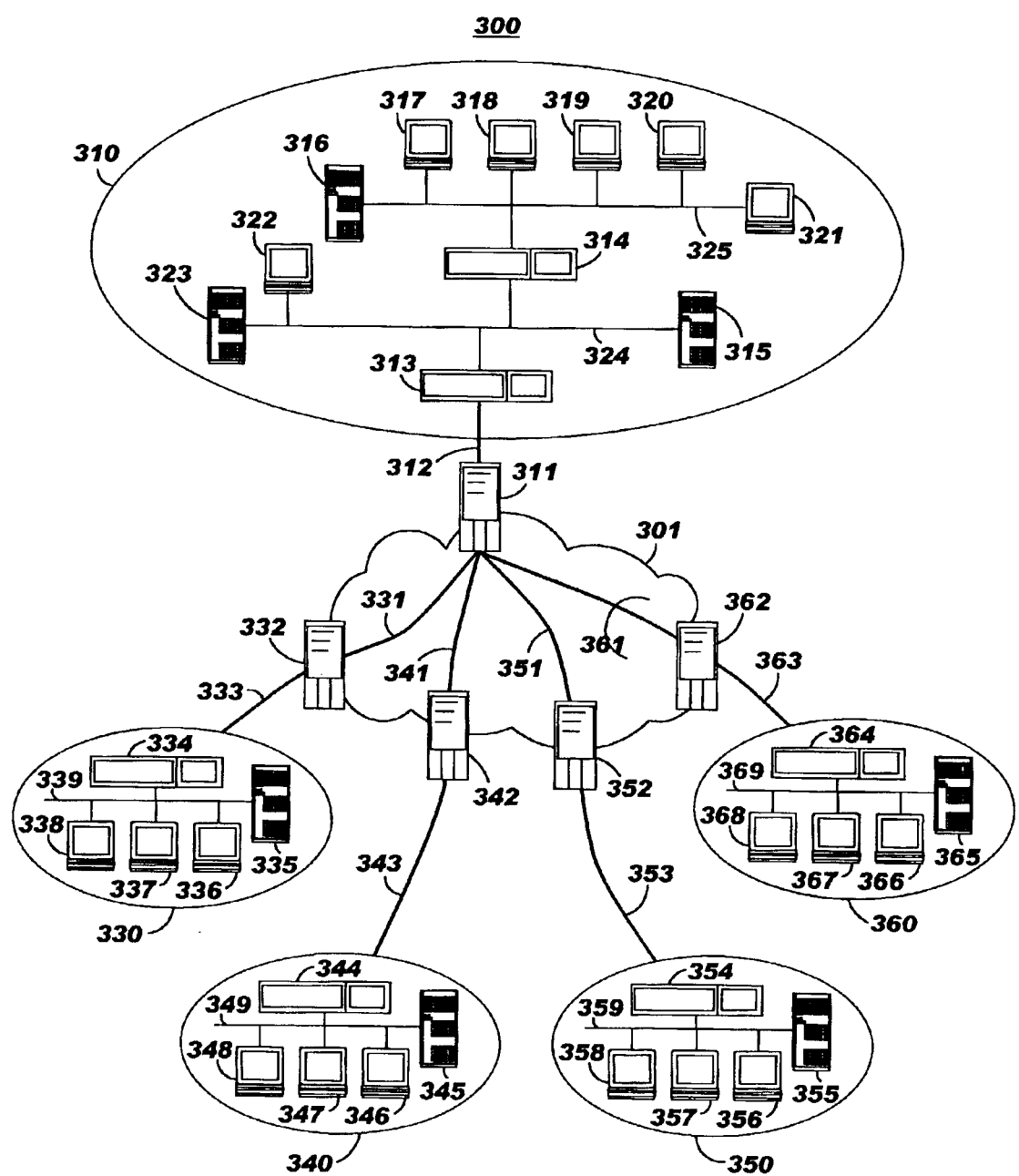
FIG. 3 is a general view of a communication network management system according to a preferred embodiment of the present invention.

FIG. 3 shows a typical network communication system 300 for interconnecting different locations of a company (a headquarters location 310, and branch office locations 330, 340, 350 and 360). A wide area network comprising multiple access nodes (311, 332, 342, 352 and 362) interconnected through communication channels (331, 341, 351 and 361), is used as a backbone network 301. Each branch office location (330, or 340, or 350 or 360) is equipped with an access device (334, or 344, or 354, or 364) connected on one side through a communication line (333, or 343, or 353, or 363) to the access node (332, or 342, or 352, or 362) of the backbone network 301, and on the other side to a local area network (339, or 349, or 359, or 369) to which are attached both local servers (335, or 345, or 355, or 365) and workstations (336, 337, 338, or 346, 347, 348, or 356, 357, 358, or 366, 367, 368).

Similarly, the headquarters location 310 is equipped with an access device 313 which is connected on one side through a communication line 312 to the entry node 311 of the infrastructure network 301, and on the other side to the local area network 324 to which are attached a corporate server 315 and a switching device 314 which allows communication, through a cabling system 325, with resources such as a local print server 316 and workstations (317, 318, 319, 320 and 321).

Within the headquarters location 310, an SL Manager device 323, and its associated console 322, are attached to the local area network 324. The SL Manager device 323 communicates with the SL Managed devices such as the access nodes (311, 332, 342, 352, and 362), the access devices (313, 334, 344, 354, and 364), and the switching device 314.

Outages

For sudden severe problems, the response or reaction time (duration between the occurrence of the problem and its detection) of a management system must be as short as possible, so that the relevant recovery or by-pass procedures may be initiated as soon as possible in order to limit the detrimental consequences of the problem. If the objective is to monitor the state of selected resources within a communication network system, a conventional management system typically checks that the SL Managed devices are up and running. For this purpose ALIVE messages are exchanged between the SL Manager device and each SL Managed device. A well known example is the exchange of ICMP PING requests and replies in Internet Protocol (IP) networks. A typical frequency for exchanging such PING messages is once every five minutes.

Performance Problems

Conventional means for managing the performance of a communication network are less demanding in terms of reaction time because, most of the time, the observed problem evolves slowly. Nevertheless, these means are more demanding in terms of amount of information. Multiple parameters need to be gathered by the SL Manager device to conduct an efficient analysis of the communication network system behavior. Most conventional means are based on the implementation of a MONITORING protocol between the SL Manager and each SL managed device. For instance, in IP networks, SNMP Get requests and replies are exchanged. The information gathered by means of these messages is commonly recorded in a Management Information Bases (MIB). These bases are either normalized (the famous MIB-II) or are proprietary. A Management Information Base can be considered as a structured set of indicators and thresholds characterising the network conditions seen and recorded by the SL Managed devices. As the amount of information that can be carried within these messages may be quite large, and as the tracked indicators may evolve relatively slowly, the SNMP GET: messages are not exchanged very often, typically with a frequency of once every fifteen minutes.

The MONITORING and ALIVE protocols introduced above consume network resources that could otherwise be allocated to support regular traffic. In other words, there is a cost associated with each of these two management techniques. Such a cost is typically measured (among other parameters) by the amount of bandwidth required to exchange the network management information between the SL Manager device and the various SL Managed devices.

Without attempting to recall the history of the Internet phenomenon, it is important to note that the Internet Protocol (IP) and its derivative protocols like SNMP (Simple Network Management Protocol) were designed during the eighties, that is 20 years ago, when the reliability of network components (both communication media and communication equipment) was still limited. Since then, communication networks have become more reliable. Today, network outages (either resulting from a sudden problem or from a slow degradation) have become relatively rare and limited while network performance is continuously improving. However, as network users have become more and more demanding about the overall availability of networks, it is still desirable to detect problems as soon as possible, which requires maintaining a reaction time as short as possible. Thus, MONITORING and ALIVE protocols continue to be implemented (with the frequencies previously quoted for exchanging messages), although the network events they are supposed to detect happen less and less frequently. Consequently, conventional means are perceived as being more and more expensive (for instance in terms of required bandwidth to carry out the management protocols). Some network resources are reserved and allocated to crisis situations which are less and less frequent, so that there is an obvious waste of network resources during the great majority of time when the communication network system behaves correctly, if not outstandingly.

The present invention is directed to a management system and method for reducing the cost of SL measurements, without impacting conventional techniques used to handle problems. The cost saving is achieved during the periods where the managed system is running correctly, and where the retrieved SL information reflects a very good quality of service.

C. General Concepts

In contrast to the conventional means and techniques just-described, the present invention provides a less expensive approach in terms of resources for managing a communication network system, while preserving a good reaction time for detecting an outage or a degradation of performance.

In summary, the present invention is based on three technical concepts:

1. Besides the conventional thresholds that are used to detect and measure the degradation of the performance of a system, the invention introduces new thresholds to indicate that the performance of the system, as observed and reported by an SL Managed device, is outstanding. The advantage is that monitoring mechanisms at lower cost can be initiated by the SL Manager device. The SL Manager device maintains, for each SL managed device, a variable called monitoring level which takes the values LOW or HIGH, thereby characterizing the performance observed and reported by the SL Managed device. If the perceived performance level is considered to be outstanding, then the monitoring level variable takes the value LOW; otherwise it takes the value HIGH.

For more clarity, it is assumed that the different pieces of SL information reported by an SL Managed device can be aggregated, and that the newly introduced thresholds can be summed into a unique new threshold, called Hthreshold. A comparison of the SL data against this new threshold Hthreshold indicates whether the SL performance level is considered to be outstanding or not.

In a similar way, the SL managed device maintains a local variable called mode, which reflects the perceived performance level. This mode variable takes the two values LOW and HIGH (according to the monitoring level variable setting), as well as DEGRADING value reflecting a situation where only the SL Managed device detects that SL performance is no longer outstanding (the SL Manager being not yet aware of this degradation).

2. The MONITORING protocol is split into two different modes, according to the former monitoring level variable which governs the frequency of the MON free-running timer, and the amount of information carried in the MON messages. When the monitoring level variable takes the value HIGH (reflecting regular service performances, the MON timer frequency remains unchanged (that means as high as with conventional means), and the amount of information carried in MON messages (referred to as "H_MON Req" and "H_MON Ack") is the same as the amount of information carried with conventional means.

When the monitoring level variable takes the value LOW (reflecting outstanding service performances), the MON timer frequency decreases, and the amount of information carried in MON messages (referred to as "L_MON Req" and "L_MON Ack") is less than the amount of information carried with conventional means. As a result, the cost for retrieving SL information is significantly reduced when the system shows outstanding performance.

3. The ALIVE protocol conventionally used to regularly check that the SL managed devices are up and running is also used to trigger the emission by the SL Managed device of an unsolicited H_MON Ack message when the performance of the system, as observed and reported by this SL Managed device, is leaving an outstanding level. This allows quick identification of any performance degradation when low cost monitoring schemes are running, so that the benefit gained by reducing the cost of the monitoring mechanisms is not achieved at the expense of increasing the time to detect a system performance degradation.

D. Scenario

1. SL Manager Device Scenario:

This scenario is based on an event-action approach which can be implemented in the SL Manager device by conventional means such as a finite state machine. This finite state machine is provided for each SL managed device under the responsibility of the SL Manager device. The description of the following scenario can be seen as resulting from an original specific command called "SL_Manager" invoked by the SL Manager device once operational after power-on. The SL Manager device is by default in an "event waiting" state where different events can be detected, leading to appropriate actions.

If an ALIVE tick event is detected, the SL Manager first issues first an ALIVE Req message to the SL managed device, and second starts an ALIVE reply timer.

If a MON tick event is detected, the SL manager first checks the value LOW or HIGH of the monitoring level variable corresponding to the SL managed device, second issues to the SL managed device either a L_MON or a H_MON Req message (if the value of the monitoring level variable is respectively found equal to LOW or HIGH), and third starts a MON reply timer.

If an Ack message is received (either an ALIVE Ack message answering an ALIVE Req message, or an L_MON Ack message answering an L_MON Req message, or an H_MON Ack message answering an H_MON Req message, or an unsolicited H_MON Ack message triggered by either an ALIVE Req message or by a L_MON Req message), the SL Manager device:

first identifies the SL managed device originator,
then stops the associated reply timer, and
third resets to zero the retry count associated with the SL managed device.

Furthermore if the received Ack message is either an L_MON Ack or an H_MON Ack (solicited or not), then the SL Manager extracts the SL information comprised in these Ack messages, and checks if they exceed or not the threshold Hthreshold. If they do not exceed the threshold Hthreshold, then the monitoring level is set to the value HIGH, and the frequency of the MON timer is set to a value H_FREQ. If they exceed the threshold Hthreshold, and if the monitoring level variable is found equal to low, then the frequency of the MON timer is decreased as long as it remains above a minimum value L_FREQ. In a preferred embodiment of the present invention, the strategy followed to decrease this frequency is to decrement it by a constant step, but any other similar strategy could be followed as well without departing from the spirit of the present invention. If the MON timer frequency reaches the value L_FREQ, then the monitoring level variable is set to the value LOW.

If a reply time-out event is received, then the retry count is:

first incremented, and second compared with a predetermined retry count threshold.

If the retry count threshold is reached, then the SL managed device is considered as lost, and the conventional means for handling this kind of situation are invoked.

If the retry count threshold is not reached, a test is performed to determine whether the monitoring level is equal to HIGH or not. If the monitoring level is equal to HIGH, then the last issued Req message is resent to the SL managed device (it is either an ALIVE Req message or an H_MON Req message) and the reply timer is restarted. If the monitoring level is not equal to HIGH, then a H_MON Req message is issued to the SL managed device, the reply timer is restarted and finally the monitoring level is set to the value HIGH.

2. SL Managed Device Scenario:

This scenario is based on an event-action approach which can be implemented by conventional means such as a finite state machine engine running in each SL Managed device. The description of the following scenario can be seen as resulting from an original specific command called "SL_Reportee" invoked by the SL Managed device once operational after power-on. The SL Managed device is by default in an "event waiting" state where different events can be detected, leading to appropriate actions.

If an ALIVE Req message is detected, the SL Managed device first checks whether the variable mode is equal to DEGRADING or not.

If the variable mode is equal to DEGRADING, then the local variable mode is set equal to HIGH, and more important, no ALIVE Ack message is issued, but instead the SL Managed device builds and then sends to the SL Manager device a generic H_MON Ack message. Here is the point where the ALIVE protocol and the MONITORING protocol get coupled to inform the SL Manager device about a MONITORING related event not yet known, through the emission of a generic H_MON Ack message instead of an ALIVE Ack message. This generic H_MON Ack message carries the same elements of service level information as the ones that would be comprised in an H_MON Ack message answering an H_MON Req message.

If the variable mode is not equal to DEGRADING, then the conventional process is followed by building and sending the ALIVE Ack message to the SL Manager device.

If an L_MON Req message is detected, the SL Managed device first checks whether the variable mode is equal to DEGRADING or not.

If the variable mode is equal to DEGRADING, then the local variable mode is set equal to HIGH, and more important, no L_MON Ack message is issued, but instead the SL Managed device builds and then sends to the SL Manager device a generic H_MON Ack message. This generic H_MON Ack message carries the same elements of service level information as the ones that would be comprised in an H_MON Ack message answering an H_MON Req message.

If the variable mode is not equal to DEGRADING, then the variable mode is set equal to LOW, and the L_MON Ack message is built and sent to the SL Manager device.

If an H_MON Req message is received, then the variable mode is set equal to HIGH, and the H_MON Ack message is built and sent to the SL Manager device.

If an "SL Degrade" event is received, and if the variable mode is found equal to LOW, then the mode variable is set equal to DEGRADING.

E. Advantages of the Invention

To illustrate the benefits of the proposed invention, consider the case of a networking system where the ALIVE and MONITORING protocols are respectively based on ICMP PING and SNMP GET commands. The protocol cost is measured in terms of the amount of bandwidth required for carrying out these commands.

Notation:

ALIVE messages: length A for Req and Ack, frequency FA

H_MON messages: length M for Req and Ack, frequency FM

L_MON messages: length m for Req and Ack, frequency Fm

Conventional Means Costs:

With conventional means, only the ALIVE and H_MON messages are exchanged. The resulting cost is equal to:

$C1 = A \times FA + M \times FM$

Invention Costs:

With the present invention, the ALIVE, H_MON and L_MON messages are exchanged. If the variable L represents the time ratio during which L_MON messages are exchanged instead of H_MON messages, then the resulting cost is: $C2 = A \times FA + L \times m \times Fm + (1-L) \times M \times FM$.

Numerical Example:

The following numbers are typical of what is found in network monitoring systems.

A=492 bytes
M=11300 bytes
m=5400 bytes
1/FA=5 minutes
1/FM=15 minutes
1/Fm=60 minutes
L=96%

$$C1 = 492/5 + 11300/15 = 852 \text{ bytes/min}$$

$$C2 = 492/5 + 0.96 \times 5400/60 + 0.04 \times 11300/15 = 215$$

$$C2/C1 = 3.96$$

Thus in this specific example, the present invention allows a cost reduction of the monitoring process in a ratio of approximately 1:4 while preserving the average response time for detecting either a solid failure or a performance degradation.

F. Methods

The method used by a SL Manager device for managing SL measurements according to a preferred embodiment of the present invention is summarized in flowchart 100 in FIG. 1. This method can be considered as the processing of the SL_Manager command.

At step 101, the method is in its default state, waiting for an event to initiate the process.

At step 102, an event has been detected, resulting either from the reception of a message, or from a timer time-out condition.

If an ALIVE tick event is detected, then control is given to step 103.

If a MON tick event is detected, then control is given to step 105.

If an ALIVE Ack message is detected, then control is given to step 110.

If a generic H_MON Ack message is detected, then control is given to step 133.

If an H_MON Ack message or an L_MON Ack message is received, then control is given to step 113.

If a reply time-out event is detected, then control is given to step 124.

At step 103, an ALIVE Req message is sent to the SL managed device.

At step 104, the reply timer is started to detect any possible lack of ALIVE Ack message in response to the just-issued ALIVE Req message. Then control is given to the initial step 101.

At step 105, a test is performed to check the value of the monitoring level variable. If the value is equal to the value LOW, then control is given to the step 106. If the value is equal to the value HIGH, then control is given to step 108.

At step 106, an L_MON Req message is sent to the SL managed device

At step 107, the reply timer is started to detect any possible lack of an L_MON Ack message in response to the just-issued L_MON Req message. Then control is given to the initial step 101.

At step 108, an H_MON Req message is sent to the SL managed device.

At step 109, the reply timer is started to detect any possible lack of an H_MON Ack message in response to the just-issued H_MON Req message. Then control is given to the initial step 101.

At step 110, the sender of the received message is identified.

At step 111, the reply timer (associated with the sender identified at the previous step) is stopped. This timer was previously started at step 104 (no retry case), or at step 132 (retry case).

At step 112, the retry count is reset to zero. Then control is given to the initial step 101.

At steps 133 and 113, the sender of the received message is identified. Step 133 identifies a sender using a generic H_MON Ack message. Step 113 identifies a sender using a H/L_MON Ack message. At step 134 (as at step 114), a reply timer is stopped.

At step 114, the reply timer (associated with the sender identified at the previous step) is stopped. This timer was previously started at step 107 (answer to an L_MON Req message without retry), or at step 109 (answer to an H_MON Req message without retry), or at step 132 or 129 (answer to an H_MON or L_MON Req message with retry when the monitoring level is equal to HIGH ).

At step 115, the retry count is reset to zero.

At step 116, the SL information is retrieved from the received H_MON or L_MON Ack message. This information is summed into a variable SLData.

At step 117, a test is performed to determine whether the variable SLData is greater than the threshold Hthreshold or not. If it is greater, then control is given to step 120; otherwise control is given to step 118.

At step 118, the variable monitoring level is set equal to the value HIGH.

At step 119, the frequency of the MON timer is set equal to the value H_FREQ. Then control is given to the initial step 101.

At step 120, a test is performed to check the value of the monitoring level variable. If the value is equal to LOW, then control is given to step 121; if the value is equal to HIGH, then control is given to the initial step 101.

At step 121, the frequency of the MON timer is decreased, as long as it remains above the value L_FREQ.

At step 122, a test is performed to determine whether the frequency of the MON timer is equal to the value L_FREQ. If it is equal, then control is given to step 123; otherwise control is given to the initial step 101.

At step 123, the variable monitoring level is set equal to the value LOW . Then control is given to the initial step 101.

At step 124, the retry count is incremented by one.

At step 125, a test is performed to check whether the value of the retry count is equal to a predefined threshold or not. If it is equal, then control is given to step 126; otherwise control is given to step 127.

At step 126, the SL managed device is declared as lost and the conventional means for handling this case are invoked. This ends the method for the lost SL managed device.

At step 127, a test is performed to check the value of the monitoring level variable. If the value is equal to LOW, then control is given to step 128; if the value is equal to HIGH, then control is given to the step 131.

At step 128, an H_MON Req message is sent to the SL managed device.

At step 129, the reply timer is started to detect any possible lack of H_MON Ack message in response to the just-issued H_MON req message.

At step 130, the variable monitoring level is set equal to the value HIGH. Then control is given to the initial step 101.

At step 131, the last issued Req message is resent to the SL managed device.

At step 132, the reply timer is started in order to detect any possible lack of an Ack message in response to the just-issued Req message. Then control is given to the initial step 101.

At step 133, the sender of the received message is identified.

At step 134, the reply timer (associated with the sender identified at the previous step) is stopped. As the generic H_MON Ack message can answer either an ALIVE Req message or an L_MON Req message, this timer was previously started at step 104 (answer to an ALIVE Req message without retry), or at step 107 (answer to an L_MON Req message without retry). Then control is given to step 115.

Figure 2:
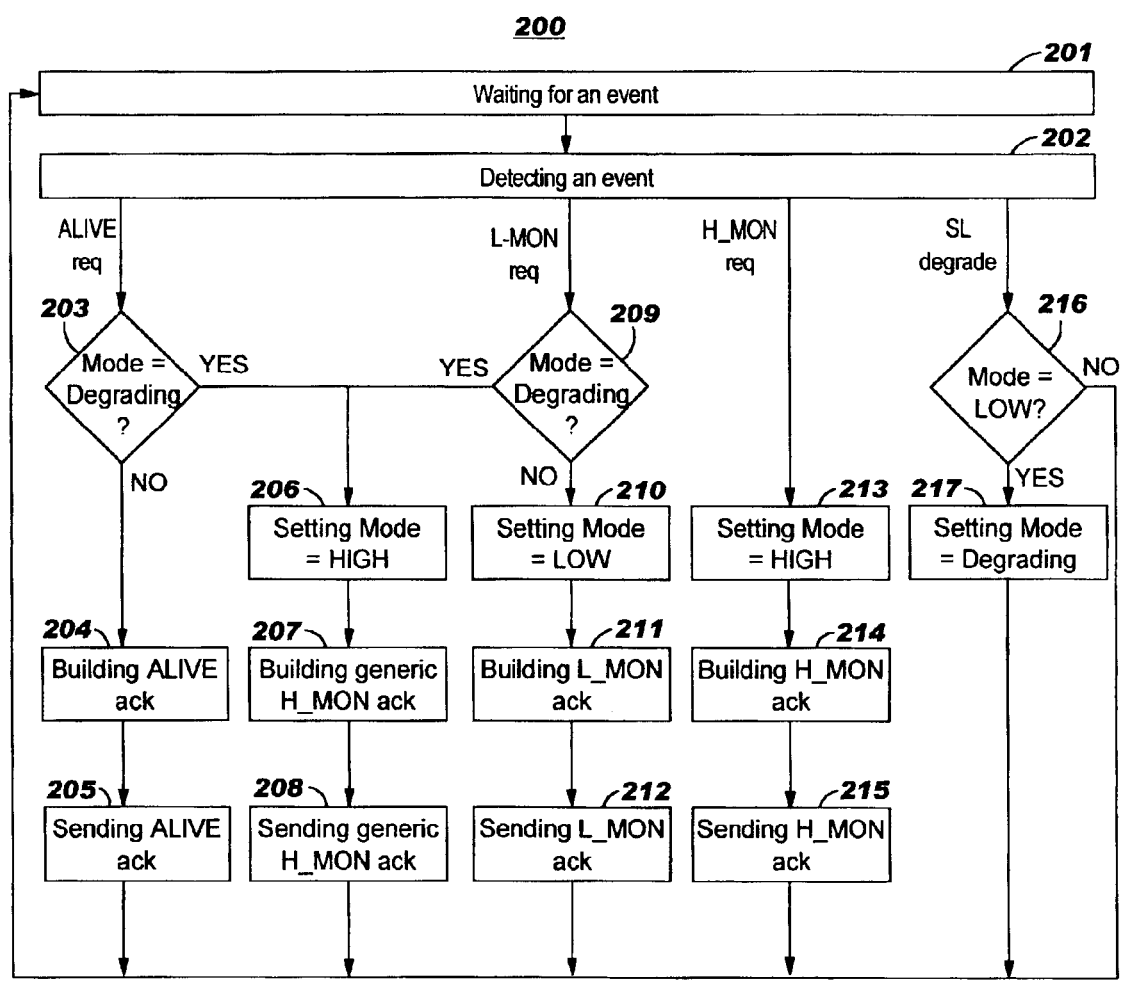
FIG. 2 shows a method for executing an "SL_Reportee" command according to a preferred embodiment of the present invention.

The method used by an SL managed device for managing SL measurements according to the present invention is summarised in flowchart 200 of FIG. 2. This method can be considered as the processing of the SL_Reportee command.

At step 201, the method is in its default state, waiting for an event to initiate the process.

At step 202, an event has been detected, resulting either from the reception of a message, or from a network performance degradation.

If an ALIVE Req message is detected, then control is given to step 203.

If an L_MON Req message is detected, then control is given to step 209.

If an H_MON Req message is detected, then control is given to step 213.

If an SL_Degrade event is detected, then control is given to step 216.

At step 203, a test is performed to check the value of the mode variable. If the value is equal to DEGRADING, then control is given to step 206; otherwise control is given to step 204.

At step 204, the ALIVE Ack message answering the just received ALIVE Req message is built.

At step 205, the ALIVE Ack message is sent to the SL Manager device. Then control is given to the initial step 201.

At step 206, the mode variable is set equal to HIGH.

At step 207, a generic H_MON Ack message is built, although no H_MON Req message has been received. Nevertheless this message carries the same elements of service level information as would be included in an H_MON Ack message answering an H_MON Req message.

At step 208, the generic H_MON Ack message is sent to the SL Manager device. Then control is given to the initial step 201.

At step 209, a test is performed to check the value of the mode variable. If the value is equal to DEGRADING, then control is given to step 206; otherwise control is given to step 210.

At step 210, the mode variable is set equal to LOW.

At step 211, the L_MON Ack message answering the just received L_MON Req message is built.

At step 212, the L_MON Ack message is sent to the SL Manager device. Then control is given to the initial step 201.

At step 213, the mode variable is set equal to HIGH.

At step 214, the H_MON Ack message answering the just received H_MON Req message is built.

At step 215, the H_MON Ack message is sent to the SL Manager device. Then control is given to the initial step 201.

At step 216, a test is performed to check the value of the mode variable. If the value is equal to LOW, then control is given to step 217; otherwise control is given to the initial step 201.

At step 217, the mode variable is set equal to DEGRADING

While the invention has been particularly shown and described with reference to a preferred embodiment, it will be understood that various changes in form and detail may be made therein without departing from the spirit and scope of the invention.

What is claimed is:

1. A management method for use in a manager device, for dynamically adjusting an amount of information retrieved from one or a plurality of managed devices in an information processing system, according to a provided level of service, said method comprising for each managed device, the steps of:

each time an event generated by an alive timer is detected:
  sending an alive request to the managed device for determining whether the managed device is alive or not;

each time an event generated by a monitoring timer is detected:
  if, based on service level information previously stored, the service level provided by the managed device meets a predetermined level of service:
    sending a monitoring request to the managed device for requesting a first amount of monitoring information;
  if, based on the service level information previously stored, the service level provided by the managed device does not meet the predetermined level of service:
    sending a monitoring request to the managed device for requesting a second amount of monitoring information, where the second amount of monitoring information is greater than the first amount of monitoring information;
  if a monitoring reply is received from the managed device in response to a monitoring request or to an alive request:
    determining, based on service level information comprised in said monitoring reply, whether the level of service provided by the managed device meets the predetermined level of service;
    storing said service level information;
  if no alive reply to an alive request or no monitoring reply to a monitoring request is received from the managed device, and
  if, based on the service level information previously stored, the level of service provided by the managed device meets the predetermined level of service:
    sending a monitoring request to the managed device for requesting the second amount of monitoring information; and
    updating the service level information previously stored by indicating that the service level provided by the managed device does not meet the predetermined level of service.

2. The management method for use in a manager device according to claim 1, wherein the step of sending an alive request to the managed device, comprises the further steps of starting an alive reply timer;
  wherein the step of sending a monitoring request to the managed device comprises the further step of starting a monitoring reply timer.

3. The management method for use in a manager device according to claim 1, wherein, when a monitoring reply to a monitoring request or to an alive request is received, the step of determining, based on service level information comprised in said monitoring reply, whether the level of service provided by the managed device meets the predetermined level of service, comprises the further steps of:
  if the level of service provided by the managed device meets the predetermined level of service, decreasing the frequency of events generated by the monitoring timer; and
  if the level of service provided by the managed device does not meet the predetermined level of service, increasing the frequency of events generated by the monitoring timer.

4. The management method for use in a manager device according to claim 3, wherein after the step of decreasing the frequency of events generated by the monitoring timer, the method further comprises the steps of:
  comparing the frequency of events with a first threshold; and
  if the frequency of events is lower than said first threshold, maintaining the frequency of events unchanged.

5. The management method for use in a manager device according to claim 3, wherein after the step of increasing the frequency of events generated by the monitoring timer, the method further comprises the steps of:

comparing the frequency of events with a threshold; and if the frequency of events is higher than said threshold, maintaining the frequency of events unchanged.

6. The management method for use in a manager device according claim 1, wherein if no alive reply or no monitoring reply to an alive request or no monitoring reply to a monitoring request is received from the managed device, and if the level of service provided by the managed device does not meet the predetermined level of service, sending again the monitoring request or the alive request that has not been received to the managed device.

7. The management method for use in a manager device according to claim 1, comprising, if no alive reply or no monitoring reply to an alive request or no monitoring reply to a monitoring request is received from the managed device, the further steps of:

incrementing a retry count;

comparing the retry count with a first threshold; and if the retry count exceeds the threshold, considering the managed device as lost.

8. The management method for use in a manager device according claim 1, wherein said information processing system is a communication network.

9. A computer readable medium containing a computer program comprising instructions that when executed in the manager device carry out the method for dynamically adjusting an amount of information retrieved from one or a plurality of managed devices according to claim 1.

10. A management method for use in a device managed by a manager device, in an information processing system comprising one or a plurality of managed devices, for dynamically adjusting, according to a provided level of service, an amount of information to send to the manager device, said method comprising, the steps of:

if an alive request is received from the manager device:
 if, based on service level information previously stored, the managed device considers that the level of service is not degrading:
  sending to the manager device an alive reply to the received alive request;
 if, based on the service level information previously stored, the managed device considers that the provided level of service is degrading:
  updating the service level information previously stored by indicating that the service level provided by the managed device does not meet a predetermined level of service;
  sending to the manager device a monitoring reply comprising a first amount of monitoring information, said monitoring information comprising the service level information;

if a monitoring request for requesting the first amount of monitoring information is received from the manager device:
 updating the service level information previously stored by indicating that the service level provided by the managed device does not meet the predetermined level of service;
 sending to the manager device a monitoring reply comprising the requested first amount of monitoring information, said monitoring information comprising the service level information;

if a monitoring request for requesting a second amount of monitoring information is received from the manager device, where the first amount of monitoring information is less than the second amount of monitoring information:
 if, based on service level information previously stored, the managed device considers that the level of service is not degrading:
  updating the service level information previously stored by indicating that the service level provided by the managed device meets the predetermined level of service;
  sending to the manager device a monitoring reply comprising the requested second amount of monitoring information, said monitoring information comprising the service level information;
 if, based on a service level information previously stored, the managed device considers that the provided level of service is degrading:
  updating the service level information previously stored by indicating that the service level provided by the managed device does not meet the predetermined level of service;
  sending to the manager device a monitoring reply comprising the first amount of monitoring information, said monitoring information comprising the service level information;

if an event indicating that the level of service provided by the managed device is degrading is received:
 if, based on the service level information previously stored, the managed device considers that the provided level of service meets the predetermined level of service, updating the service level information previously stored by indicating that the service level provided by the managed device is degrading.

11. The management method for use in a device managed by a manager device according to claim 10, wherein said monitoring information sent to the manager device in the monitoring reply to the monitoring request, comprises the updated service level information.

12. A computer readable medium containing a computer program comprising instructions that when executed in the managed device carry out the method for dynamically adjusting an amount of information to send to the manager device according to claim 10.

* * * * *